Aug. 29, 1933.   F. LJUNGSTROM   1,924,867
CONTROL FOR SELF PROPELLED VEHICLES
Filed July 2, 1929   3 Sheets-Sheet 2
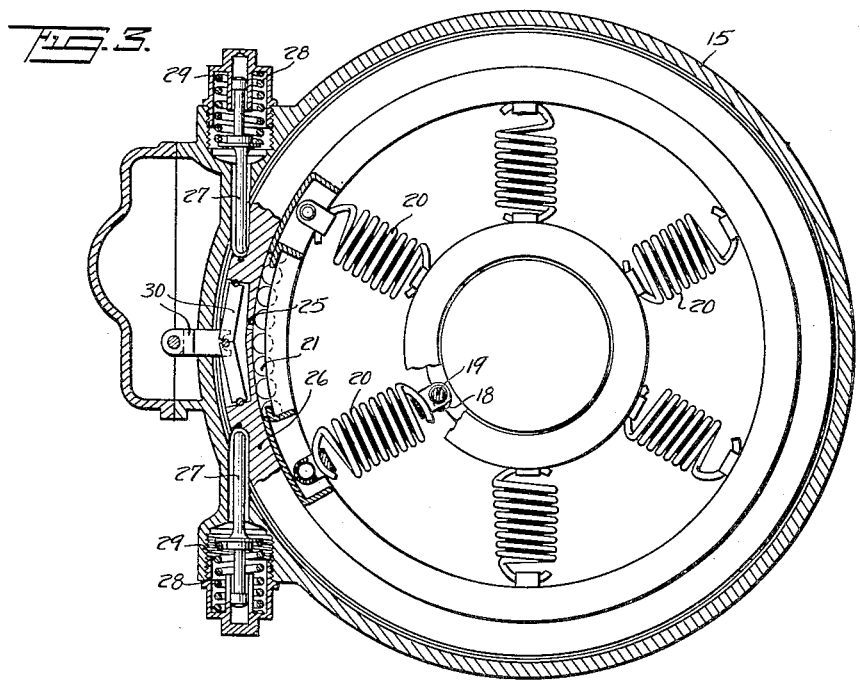
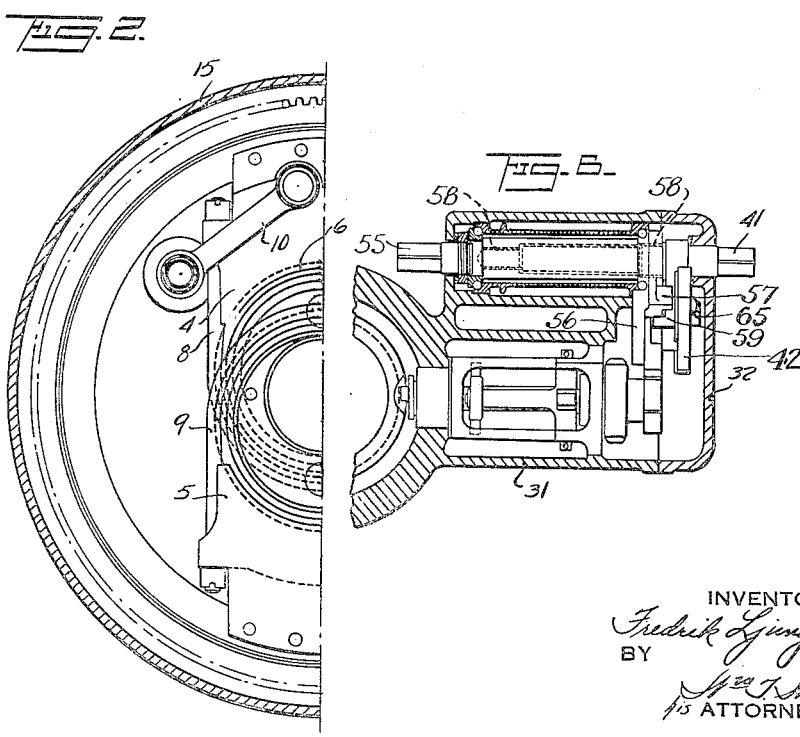
INVENTOR
Fredrik Ljungstrom
BY
ATTORNEY Aug. 29, 1933.  F. LJUNGSTROM  1,924,867
CONTROL FOR SELF PROPELLED VEHICLES
Filed July 2, 1929  3 Sheets-Sheet 3
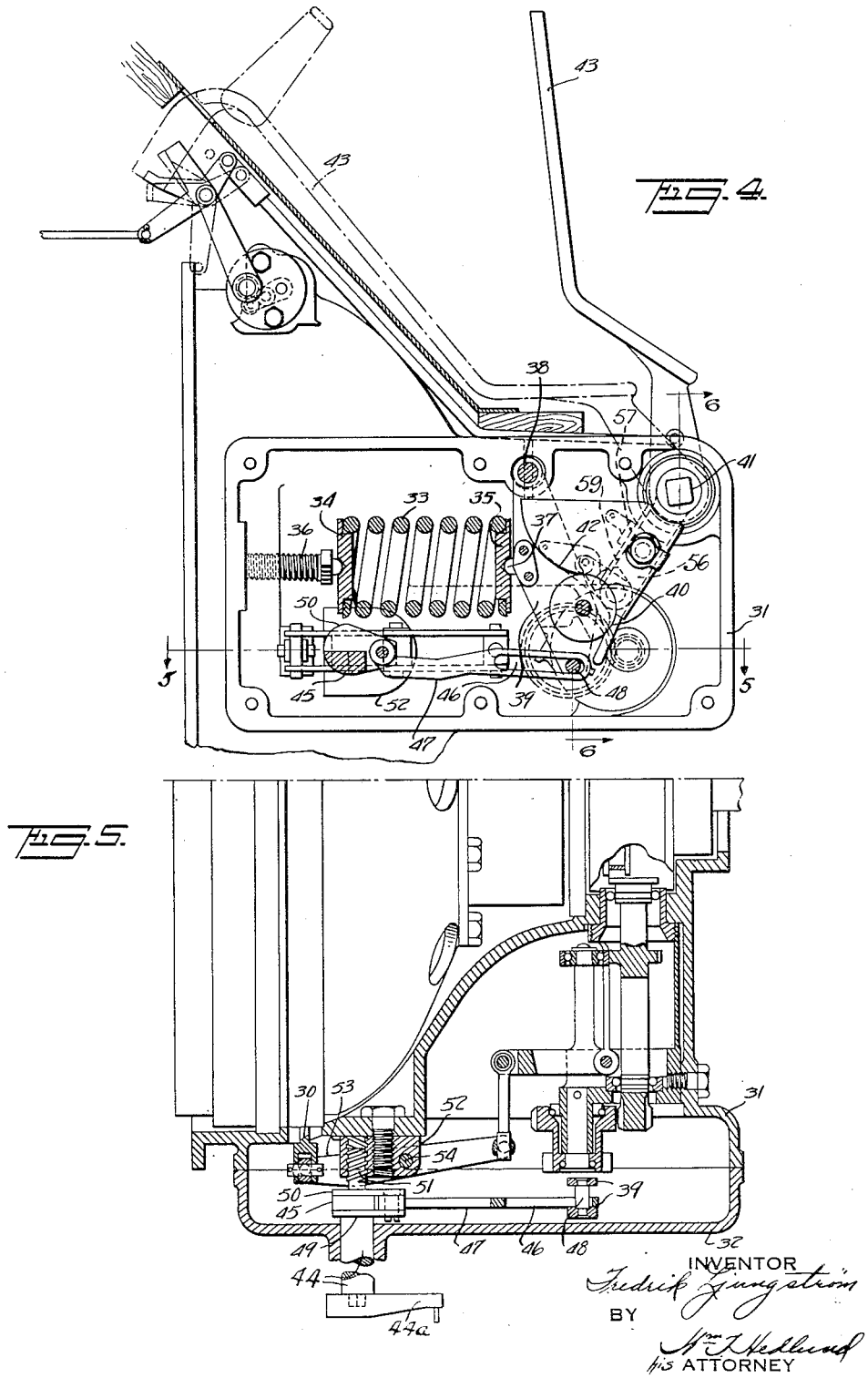

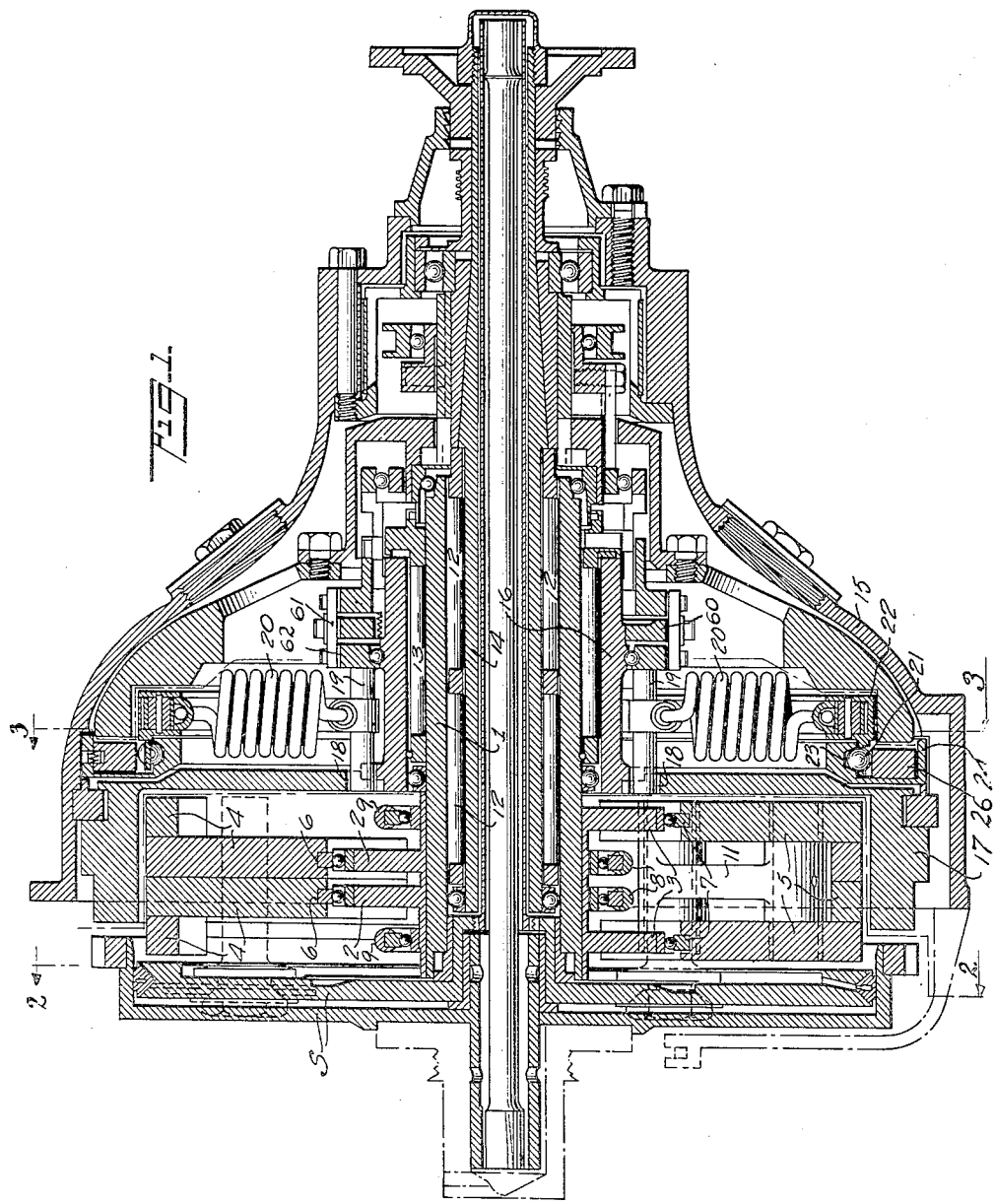

Patented Aug. 29, 1933

1,924,867

UNITED STATES PATENT OFFICE 1,924,867

CONTROL FOR SELF-PROPELLED VEHICLES

Fredrik Ljungstrom, Stockholm, Sweden, assignor, by mesne assignments, to Ped, Incorporated, a corporation of Delaware Application July 2, 1929, Serial No. 375,506, and in Sweden July 3, 1928

10 Claims.  (Cl. 192—4)

The present invention relates to self-propelled vehicles. More particularly, the invention relates to self-propelled vehicles of the character having incorporated therein variable speed transmissions of the type disclosed in my copending application 218,293 filed September 8, 1927, which application has matured into United States Patent 1,810,283 granted to me June 16, 1931, and having brakes of the type which are automatically applied by spring or other mechanical action and which are adapted to be manually released by the operator of the vehicle.

In vehicles of this character, free movement of the vehicle is prevented, in the absence of an operator in the vehicle, due to the application of the brakes by the brake applying spring and, even though the brakes are released, free movement of the vehicle in both forward and backward direction is prevented because of inherent characteristics of the transmission, as will hereinafter more fully appear.

The above mentioned characteristics make it impossible to move a vehicle of the character under consideration freely by hand power, in a garage or like place, without there being an operator at the controls to release both the brake and, if necessary, also the transmission, and the primary object of the present invention is to provide means for effecting release of those parts of the vehicle mechanism which prevent free rolling movement of the vehicle. More specifically, the object of the invention is to provide release, concurrently and by means of a common operating member, of the vehicle brakes and of certain parts of the transmission tending to prevent movement of the vehicle in one direction.

The more detailed objects of the invention and the advantages to be derived from its use may best be understood from a consideration of the following description of one form of mechanism for carrying the invention into effect, which is illustrated in the accompanying drawings forming a part of this specification.

In the drawings:

Fig. 1 is a more or less diagrammatic longitudinal central section of a transmission of the type disclosed in the aforementioned U. S. Patent No. 1,810,283;

Fig. 2 is a half transverse section taken on the line 2—2 of Fig. 1;

Fig. 3 is a transverse section taken, approximately, on the line 3—3 of Fig. 1, certain parts being omitted and other parts being broken away for the sake of clearness;

Fig. 4 is a side elevation of part of the transmission shown in Fig. 1 and illustrating the control box thereof with the cover plate removed;

Fig. 5 is a plan view of a part of the transmission, a portion of the figure being taken, approximately, on the line 5—5 of Fig. 4; and Fig. 6 is a transverse section through the control box taken, approximately, on the line 6—6 of Fig. 4.

I will, first, briefly describe the transmission, which is of known type and which is fully disclosed in all its essential details in Patent No. 1,810,283, hereinabove referred to, to which patent reference may be had for such details of construction as form no part of the present invention.

The transmission, primarily, comprises a rotary driving member and an intermediate transmission member to which, under certain conditions of drive, alternate opposite turning moments are applied through the medium of inertia masses rotated by the driving member. The alternate opposite turning moments applied to the intermediate member are segregated, preferably by overrunning roller clutches which grip and release in opposed relation, the segregated turning moments of one sense or direction being applied to the driven member of the transmission, while the segregated turning moments of the opposite sense or direction are directed to an abutment formed by the transmission casing. The effect of this method of operation is to cause the intermediate member to advance in one direction under the influence of intermittently applied turning moments, and to cause rotation in one direction of the driven member of the transmission. The above described condition of drive I term asynchronous drive, since, with the transmission operating in the described manner, the speed of the driven member thereof is less than the speed of the driving member.

Under other conditions of drive, which I term synchronous drive, the inertia masses transmit to the intermediate member of the transmission a continuous turning moment in one sense or direction, which is in turn transmitted to the driven member of the transmission by one of the clutches associated with the intermediate member, the other clutch being idle under this condition of drive.

Referring now more particularly to the drawings, reference character 1 denotes the intermediate member of the transmission which is in the form of a generally cylindrical clutch sleeve. Sleeve 1 has mounted thereon, near its forward end, the eccentrics 2 and 3, upon which are rotatably mounted the inertia masses 4 and 5, respectively, by means of radial ball bearings 6 and 7 and the straps or stirrups 8 and 9, respectively. Inertia masses 4 and 5 are connected, respectively, by means of connecting rods 10 and 11, to the driving member of the transmission, which, in the present embodiment, comprises the fly-wheel unit S adapted to be driven from the crank shaft of an internal combustion engine or other prime mover.

Under conditions of asynchronous drive, rotation of fly-wheel S causes the inertia masses 4 and 5 to move in planetary paths and to apply to the sleeve 1 turning moments of alternate opposite sense or direction, or, in other words, to apply to the intermediate member oscillating torque.

Mounted within the sleeve 1 is the driven member of the transmission which is in the form of a sleeve 14. The inner surface of sleeve 1 and the outer surface of sleeve 14 are radially spaced from each other and are provided with gripping surfaces providing a series of axially extending pockets in which are located the roller detents 12, these detents and the gripping surfaces being arranged so that the detents will act to transmit motion selectively in one direction only. In other words, the sleeves 1 and 14 and the roller detents 12 provide an overrunning roller clutch for transmitting motion in selected direction from the intermediate member of the transmission to the driven member thereof, which clutch I will term an action clutch.

Outside of sleeve 1 there is mounted another clutch sleeve 16, the inner surface of which cooperates with the outer surface of sleeve 1 to form between the sleeves a series of axially extending pockets in which are roller detents 13. Sleeves 1 and 16 and roller detents 13 form a second overruning clutch similar to the clutch just described, and this second clutch I will term a reaction clutch.

The clutch sleeve 16 is releasably connected to the transmission casing by means adapted to prevent the transmission of undesirable vibrations to the casing. The specific details of this means, per se, form no part of the present invention.

This means comprises a collar 60 rigidly secured to the clutch sleeve 16 from which turning movement is transmitted by means of a plurality of pins 61 to a collar 62 rotatably mounted on sleeve 16 by means of a suitable ball bearing. Collar 62 carries a plurality of peripherally spaced axial pins 19, the forward ends of which project into peripherally extending slots 18 (see Figs. 1 and 3) in a rotatably mounted weight 17 which I will term a reaction inertia mass. Pins 19 provide anchorages for the inner ends of a set of radially disposed coil springs 20, the outer ends of which are secured to suitable hangers mounted on a circular member or ring 22 having an axially extending flange portion perforated to form a holder or cage for a plurality of balls 21. Balls 21 are situated between an inner race formed by groove 23 in ring 24 and an outer race formed by a spring ring 26 slotted at 25 (Fig. 3). As will be seen from Fig. 1, ring 24 is U-shaped in cross-section and extends around the outer periphery of ring 26. Rings 24 and 26 are held against rotation by means of pins 27 (Fig. 3), which pins are pressed toward each other by means of the compression springs 28 mounted in the caps 29 screwed into the transmission casing 15.

Pins 27 tend to compress the split ring 26, which action locks the balls 21 between this ring and ring 24 to prevent rotation of the balls. This, in turn, prevents rotation of ring 22 due to the fact that balls 21 are caged in the ball retaining portion of the latter ring.

Ring 22 is released so as to permit its rotation by spreading ring 26 through the medium of the toggle mechanism 30, which mechanism is adapted to spread the ring against the resistance of springs 28.

Upon release of the ring 22 so as to permit its free turning movement, it will be evident that the sleeve 16, which is connected to ring 22 through the described means including springs 20, will also be disconnected, with respect to rotational movement, from the transmission casing and will be free to rotate.

The action of the toggle mechanism 30 in releasing the transmission for the purpose of effecting the object of the present invention is as follows. Let it be assumed that the transmission is set so as to transmit drive in clockwise direction, looking from the left of Fig. 1, which direction of drive, it will be assumed, corresponds to forward motion of the vehicle in which the transmission is mounted. With the transmission set in this manner, the action clutch rollers 12 are positioned so that this clutch transmits motion in clockwise direction from the sleeve 1 to the sleeve 14 and overruns in counter-clockwise direction, while the reaction clutch rollers 13 are positioned so that the reaction clutch transmits force in counter-clockwise direction from sleeve 1 to sleeve 16 and overruns to permit sleeve 1 to turn in clockwise direction with respect to sleeve 16. If, with the clutch rollers set in this manner, the vehicle is moved by a source of power other than the engine, the driven member 14 will be rotated in clockwise direction and this movement of the driven member 14 can take place freely, insofar as the transmission is concerned, because of the assumed setting of the action clutch rollers 12. If, however, it is attempted to move the vehicle in backward direction, such movement will tend to cause the driven member 14 to rotate in counter-clockwise direction and this movement is prevented by the transmission. If it is attempted to turn the driven member in counter-clockwise direction, under the assumed conditions, the action clutch rollers 12 will transmit the turning force from the driven member 14 to the intermediate sleeve 1, tending to turn this sleeve also in counter-clockwise direction. The tendency of sleeve 1 to turn in counter-clockwise direction will be transmitted through the rollers 13 to the sleeve 16, which sleeve is prevented from rotating because of its resilient anchorage to the transmission casing through the mechanism comprising the springs 20. It will thus be seen, that because of the locking action of the clutches in the transmission, it is not possible to turn the driven member of the transmission in a direction opposite to the direction of drive for which the transmission is set.

However, if the ring 26 is expanded by actuation of the toggle 30, the driven member 14 may be turned in counter-clockwise direction, with the transmission set in the above assumed manner, because the expansion of ring 26 operates to release the balls 21 and permit free rotation of the clutch sleeve 16, which then no longer acts to restrain turning movement in counter-clockwise direction of the clutch assemblies, including the member 14 and the intermediate sleeve member 1.

Turning now to Figs. 4 and 5, reference numeral 31 denotes the casing of a control box forming a part of the transmission, this control box being provided with a cover plate 32. The control box contains mechanism for altering the positions of the rollers in the transmission clutches so as to effect reversal of the transmission, but, as this mechanism forms no part of the present invention and is fully described in patent No. 1,810,283, already referred to, it will not be described herein in detail.

The control box also contains the brake actuating means, which means is acted upon by the mechanism forming the subject matter of the present invention.

In the illustrated embodiment, the control box containing the brake actuating mechanism also contains interacting mechanism whereby the transmission clutches may be reversed and the engine throttle be actuated by movement of pedal 43. The present description, however, will be confined to the brake actuating part of the control mechanism since the remaining parts of this combined operating mechanism are not germane to the present invention.

Referring now more particularly to Figs. 4 and 6, the pedal 43 is secured to the projecting squared end of hollow shaft 55 which is rotatably mounted in the control box casing. This shaft is provided adjacent one end with an arm 56 having thereon a laterally projecting lug 57. The rotatably mounted brake shaft 41 is carried at one end by a suitable bearing in the cover plate 32 and is also journalled by means of bearings 58 in the hollow shaft 55. Shaft 41 constitutes what may be termed the brake actuating shaft and the projecting end of this shaft is advantageously squared for the purpose of having connected thereto the usual brake arm (not shown) for actuating the vehicle brakes. Shaft 41 is provided with an arm 59 to which is secured by means of a bolt 65 the cam plate 42. As will be seen from Fig. 6, the lug 57 on the arm of shaft 55 projects laterally so that a portion of this lug lies in the same longitudinal plane as the arm 59 on the shaft 41.

The brake actuating spring 33 is held in the casing 31 between spring retainers 34 and 35, the former bearing against an adjustable stud 36 and the latter bearing against a pin 37 secured to a lever 39 pivotally mounted on shaft 38, the latter being mounted in casing 31. Rotatably mounted on the arm or lever 39 is the roller 40 adapted to engage the cam member 42 which is fixed on the arm of the brake shaft 41. As will be seen from Fig. 4, the contour of cam 42 is such that the tendency of spring 33 to move lever 39 and roller 40 to the right as viewed in this figure, tends to cause the cam member and shaft 41 to rotate in clockwise direction to the position shown in the figure. Movement of the shaft 41 to the position shown causes application of the vehicle brakes. The abutment of the arm 59 against the lug 57 holds shaft 55 and pedal 43 in the position of rotation shown in the figure.

In order to release the brakes during normal operation of the vehicle, pedal 43 is depressed and the consequent movement of lug 57 in counter-clockwise direction causes similar movement of arm 59. This in turn causes rotation in the same direction of shaft 41, thereby effecting release of the brake and also compressing the brake spring 33 due to the concurrent movement of cam member 42 in counter-clockwise direction.

In order to make possible the release of the brakes independent of the pedal 43, a manually operable, rotatable shaft 44 is journaled in the cover plate 32 of the control box, said shaft being provided with a crank 45 connected by means of arm 47 with a pin 48 secured to the lower end of arm 39. Pin 48 passes through an elongated slot 46 in the arm 47. Crank 45, which is adapted to be turned through a half revolution, comprises spaced plates 49 and 50 between which the arm 47 passes, when the shaft is turned in clockwise direction, as viewed in Fig. 4, through a half revolution from the position shown in said figure. As will be evident from the drawings, turning movement of shaft 44 through a half revolution from the position shown in Fig. 4, will result in turning the arm or lever 39 in clockwise direction about its pivot 38, thus compressing spring 33 and permitting counter-clockwise turning movement of the cam 42 and of the brake shaft 41 to effect release of the vehicle brakes.

The inner end of shaft 44 is threaded, as shown at 51 in Fig. 5, into a block 52 secured to the casing 31 and the turning movement of shaft 44 necessary to release the brakes will also, simultaneously, cause the shaft to be moved axially in a direction such as to cause the plate 50 to strike arm 53 of a lever pivoted at 54. Arm 53 is pivotally connected to the toggle mechanism 30, shown in Fig. 3, and it will be evident that the inward and turning movements of shaft 44 will act to cause concurrent release of the brake mechanism of the vehicle and of the clutch mechanism of the transmission by concurrently turning arm 39 and actuating the toggle mechanism 30.

Shaft 44 is advantageously extended to a point affording convenient manual operation thereof and is preferably provided with a squared end adapted to be engaged by a removable hand crank 44a.

Having thus described my invention, what I claim is:

1. Apparatus of the character described comprising a variable-speed power transmission including a driven member and clutch mechanism operating to prevent rotation of the driven member in a direction opposite the direction of drive for which the transmission is set, braking mechanism tending to arrest movement of the driven member and auxiliary mechanism operable to release said braking mechanism and to concurrently render said clutch mechanism inoperative to prevent said movement of the driven member in said opposite direction.

2. Apparatus of the character described comprising a variable-speed power transmission including a driven member and mechanism normally operable to drive said member in selected direction and to prevent movement of the driven member in a direction opposite the selected direction, brake mechanism for arresting movement of the driven member, said brake mechanism including a spring tending to apply the brake, and auxiliary manually operable means for counteracting the action of said spring to release the brake mechanism and concurrently altering said first named mechanism to permit rotation of the driven member in either direction.

3. Apparatus of the character described comprising a variable-speed power transmission including a driven member and releasable mechanism normally operable to drive said member in selected direction and prevent movement of the driven member in a direction opposite the selected direction, brake mechanism for arresting movement of the driven member, said brake mechanism including a spring tending to apply the brake, and auxiliary manually operable mechanism for concurrently causing release of the brake and of said first named mechanism to permit rotation of the driven member in either direction, said auxiliary mechanism comprising an auxiliary and rotatably mounted shaft, means operated by rotation of said shaft to counteract the action of said spring, and means actuated by axial movement of said shaft for releasing said first named mechanism.

4. A variable-speed power transmission comprising a driving member, a driven member, an abutment, mechanism actuated by the driving member for alternately producing turning moments of opposite sense, mechanism for transmitting said turning moments to the driven member and to the abutment respectively, said mechanism normally operating to permit movement of the driven member in selected direction only, releasable braking means acting to arrest movement of the driven member, and auxiliary manually operable mechanism for concurrently releasing said braking means and rendering said last named mechanism inoperative to permit rotation of the driven member in either direction.

5. A variable-speed power transmission comprising a driving member, a driven member, an abutment, mechanism actuated by the driving member for alternately producing turning moments of opposite sense, mechanism for transmitting said turning moments to the driven member and to the abutment, respectively, releasable braking means acting to arrest movement of the driven member, a releasable coupling between said last named mechanism and said abutment, and means for concurrently releasing said braking means and said coupling.

6. A variable-speed power transmission comprising a driving member, a driven member, an abutment, mechanism actuated by the driving member for alternately producing turning moments of opposite sense, mechanism for transmitting said turning moments to the driven member and to the abutment, respectively, releasable braking means acting to arrest movement of the driven member, a releasable coupling between said last named mechanism and said abutment, and mechanism including a common operating member for concurrently releasing said braking means and said coupling.

7. A variable-speed power transmission comprising a driving member, a driven member, an abutment, mechanism actuated by the driving member for alternately producing turning moments of opposite sense, mechanism for transmitting said turning moments to the driven member and to the abutment, respectively, releasable braking means acting to arrest movement of the driven member, a releasable coupling between said last named mechanism and said abutment, and manually operable means for concurrently releasing said braking means and said coupling.

8. A variable-speed power transmission comprising a driving member, a driven member, an abutment, mechanism actuated by the driving member for alternately producing turning moments of opposite sense, mechanism for transmitting said turning moments to the driven member and to the abutment, respectively, releasable braking means acting to arrest movement of the driven member, a releasable coupling between said last named mechanism and said abutment, and mechanism including a common manually operable shaft for causing concurrent release of said braking means and said coupling.

9. Apparatus of the character described comprising a variable-speed power transmission including a driven member and clutch mechanism operating to prevent rotation of the driven member in a direction opposite the direction of drive for which the transmission is set, braking mechanism for arresting movement of the driven member, said braking mechanism comprising means normally acting to cause application of brakes, and auxiliary mechanism comprising a single actuating means movable from a first position permitting the first mentioned means to cause application of said brakes and permitting said clutch mechanism to prevent rotation of the driven member in a direction opposite the direction of drive for which the transmission is set to a second position preventing the first mentioned means from causing application of said brakes and rendering said clutch mechanism inoperative to prevent movement of the driven member in said opposite direction.

10. Apparatus of the character described comprising a variable-speed power transmission including a driven member and clutch mechanism operating to prevent rotation of the driven member in a direction opposite the direction of drive for which the transmission is set, braking mechanism for arresting movement of the driven member, said braking mechanism comprising a spring normally acting to cause application of brakes, manually operable means for rendering said spring inoperative to cause application of brakes during normal operation of the transmission whereby to permit rotation of the driven member in the direction of drive for which the transmission is set, and auxiliary mechanism comprising a single manually operable member movable from a first position permitting said spring to cause application of said brakes and permitting said clutch mechanism to prevent rotation of the driven member in a direction opposite the direction of drive for which the transmission is set to a second position preventing said spring from causing application of said brakes and rendering said clutch mechanism inoperative to prevent movement of the driven member in said opposite direction.

FREDRIK LJUNGSTROM.